US012614747B2

(12) United States Patent
Lee et al.

(10) Patent No.: US 12,614,747 B2
(45) Date of Patent: Apr. 28, 2026

(54) FUEL CELL MANIFOLD AND FUEL CELL STACK INCLUDING THE SAME

(71) Applicants: KOREA INSTITUTE OF SCIENCE AND TECHNOLOGY, Seoul (KR); INDUSTRY-ACADEMIC COOPERATION FOUNDATION, YONSEI UNIVERSITY, Seoul (KR)

(72) Inventors: Jong Ho Lee, Seoul (KR); Kyung Joong Yoon, Seoul (KR); Sang Hyeok Lee, Seoul (KR); Min Jun Oh, Seoul (KR); Jong Sup Hong, Seoul (KR); Woo Seok Lee, Seoul (KR)

(73) Assignees: Korea Institute of Science and Technology, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 554 days.

(21) Appl. No.: 17/544,627

(22) Filed: Dec. 7, 2021

(65) Prior Publication Data

US 2022/0407104 A1 Dec. 22, 2022

(30) Foreign Application Priority Data

Jun. 16, 2021 (KR) ........................ 10-2021-0078140

(51) Int. Cl.
*H01M 8/2485* (2016.01)
*H01M 8/2483* (2016.01)
(52) U.S. Cl.
CPC ....... *H01M 8/2485* (2013.01); *H01M 8/2483* (2016.02)

(58) Field of Classification Search
CPC ............. H01M 8/2484; H01M 8/2485; H01M 8/2483; H01M 8/0258; H01M 8/0267
See application file for complete search history.

(56) References Cited

U.S. PATENT DOCUMENTS

| | | | | |
|---|---|---|---|---|
| 2002/0064702 | A1* | 5/2002 | Gibb | H01M 8/0247 264/293 |
| 2003/0031904 | A1* | 2/2003 | Haltiner, Jr. | F28D 9/005 165/164 |
| 2005/0214627 | A1* | 9/2005 | Sugita | H01M 8/241 429/457 |

(Continued)

FOREIGN PATENT DOCUMENTS

| | | |
|---|---|---|
| JP | 3793141 B2 | 7/2006 |
| KR | 100727684 B1 | 6/2007 |

(Continued)

OTHER PUBLICATIONS

Korean Office Action dated May 30, 2023, in a communication from Korean Patent Office in the counterpart Korean application No. 10-2021-0078140.

*Primary Examiner* — Helen Oi K Conley
*Assistant Examiner* — Amanda Rosenbaum
(74) *Attorney, Agent, or Firm* — Rabin & Berdo, P.C.

(57) ABSTRACT

Disclosed herein are a fuel cell manifold and a fuel cell stack including the same. The manifold may include a cover plate, an air guide plate configured to guide a flow of air in the manifold, a fuel guide plate configured to guide a flow of fuel in the manifold, and an auxiliary plate providing a passage for inflow of air and outflow of fuel.

11 Claims, 15 Drawing Sheets

(56) References Cited

U.S. PATENT DOCUMENTS

| 2008/0142204 A1* | 6/2008 | Vanden Bussche | .... F28F 27/02 |
| | | | 62/204 |
| 2008/0145736 A1* | 6/2008 | Pratt | .................. H01M 8/2418 |
| | | | 429/513 |
| 2009/0202886 A1* | 8/2009 | Kaye | .................. H01M 8/0258 |
| | | | 429/432 |
| 2011/0053027 A1* | 3/2011 | Weingaertner | ........ F28D 9/0093 |
| | | | 429/440 |
| 2011/0136043 A1* | 6/2011 | Chen | .................. H01M 8/0273 |
| | | | 429/514 |
| 2020/0365913 A1* | 11/2020 | Zhang | .................. H01M 8/026 |

FOREIGN PATENT DOCUMENTS

| KR | 1020080069118 A | 7/2008 |
| KR | 101289112 B1 | 7/2013 |
| KR | 1020190026180 A | 3/2019 |
| KR | 102131702 B1 | 7/2020 |

* cited by examiner

700

730
720
710

100

110
120
140
130

FUEL CELL MANIFOLD AND FUEL CELL STACK INCLUDING THE SAME

CROSS-REFERENCE TO RELATED APPLICATION

This application claims under 35 U.S.C. § 119(a) the benefit of priority to Korean Patent Application No. 10-2021-0078140 filed on Jun. 16, 2021, the entire contents of which are incorporated herein by reference.

BACKGROUND

(a) Technical Field

The present disclosure relates to a fuel cell manifold and a fuel cell stack including the same.

(b) Background Art

Fuel cells serve to directly convert the chemical energy of raw material into electrical energy through an electrochemical reaction, and are advantageous in that they have significantly higher energy efficiency and emit few pollutants compared to a typical heat engine.

Among them, a solid oxide fuel cell may freely use not only hydrogen but also hydrocarbon-based fuel through internal reforming without a reformer since it operates at a high temperature of 600 to 1000° C. The solid oxide fuel cell itself may have a fuel conversion efficiency of 45 to 65% and achieve a system efficiency of 85% or more through a cogeneration system using waste heat. Therefore, the solid oxide fuel cell is receiving attention for next-generation environment-friendly electric power generation.

The solid oxide fuel cell may be mainly classified into a planar solid oxide fuel cell and a cylindrical solid oxide fuel cell depending on the shape of the end cell thereof. The cylindrical solid oxide fuel cell is advantageous in terms of long-term stability, but the planar solid oxide fuel cell may enable a higher power density to be obtained than the cylindrical solid oxide fuel cell. In recent years, a flat-tube-type solid oxide fuel cell that combines the advantages of the cylindrical and planar solid oxide fuel cells has been studied.

The solid oxide fuel cell has been in the spotlight recently because a system having a capacity of several W to MW or higher is capable of being configured when a stack is formed using a connecting material and a sealing member.

In order to produce a useful amount of electric power, a fuel cell has a plurality of unit cells stacked in series with an electrically conductive separator interposed therebetween. A fuel cell stack may be classified into an inwardly manifolded stack and an outwardly manifolded stack. In the inwardly manifolded stack, a gas passage for carrying fuel and an oxidant is installed in the fuel cell. In the outwardly manifolded stack, fuel cell plates remain open on the ends thereof, and gases are carried by manifolds or pans sealed to respective surfaces of the fuel cell stack.

Each of the manifolds provides a sealed passage for carrying fuel and air to the fuel cell and preventing these gases from leaking into a sealed environment to prevent leakage into other manifolds or from leaking into the other manifolds. In some fuel cell stack arrangements, a stack is located in an enclosure, and the environment of the enclosure contains one of the process gases. In such a system, at least three manifolds, each of which must be sealed to the stack, are required to provide inlet and outlet gas passages for the stack. In any case, the manifolds must perform the above functions under conditions required for the operation of the fuel cell stack and to prolong the lifespan thereof.

An important factor influencing the performance of the outwardly manifolded fuel cell stack is to ensure that the gas is uniformly distributed to each unit cell. For example, the unit cell disposed closest to the gas supply part of the manifold accommodates more gas than unit cells disposed far from the gas supply part. As a result, the unit cell accommodating more gas is subjected to more electrochemical reactions and generates a larger amount of electric power, by which process the unit cell is overheated considerably more than a unit cell accommodating less gas. That is, the non-uniform distribution of the gas causes a non-uniform temperature gradient in the fuel cell stack, which leads to a reduction in the lifespan of the fuel cell stack.

Accordingly, there is an increasing need for a manifold design capable of more uniformly distributing the flow of gas to unit cells in a fuel cell stack and minimizing a temperature gradient in the fuel cell stack.

Patent Document (Patent Document 1) Korean Patent No. 10-1289112

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides a manifold design capable of uniformly distributing gas to each unit cell in a fuel cell stack.

In another aspect, the present invention provides a manifold design capable of minimizing a temperature gradient in a fuel cell stack.

The present invention is not limited to the above-mentioned aspects. Other aspects of the present invention will become more apparent from the following description, and will be realized by means and combinations thereof as defined in the following claims.

In a preferred embodiment, there is provided a fuel cell stack that includes a stack unit in which a plurality of unit cells are stacked, and a manifold disposed on one surface of the stack unit to provide an inflow path for air and an outflow path for fuel. The manifold includes a cover plate including a first air flow hole through which air passes and a first fuel flow hole through which fuel passes, an air guide plate including a plurality of flow paths spaced apart from each other for guiding air introduced into one end thereof to flow toward the other end thereof, a fuel guide plate including a pattern section provided with a plurality of protrusions spaced apart from each other for guiding fuel introduced into one side thereof to flow toward the other side thereof, and an auxiliary plate including an air inflow section configured to communicate with the outside for inflow of air introduced from the outside and a fuel outflow section configured to communicate with the outside to discharge fuel in the manifold to the outside.

The manifold may be formed by stacking the cover plate, the air guide plate, the auxiliary plate, and the fuel guide plate in that order. The air introduced into the air inflow section of the auxiliary plate from the outside may move to the flow paths through a second air flow hole formed through one end of the air guide plate, flow to the other end of the air guide plate along the flow paths, and then be supplied to the stack unit through the first air flow hole of the cover plate communicating with the other end of the air guide plate.

The manifold may be formed by stacking the cover plate, the air guide plate, the auxiliary plate, and the fuel guide plate in that order. The fuel introduced into the first fuel flow hole of the cover plate from the stack unit may be introduced to one side of the fuel guide plate through a second fuel flow hole formed through the air guide plate at a position corresponding to the first fuel flow hole and through a third fuel flow hole formed through the auxiliary plate at a position corresponding to the second fuel flow hole, flow to the other side of the fuel guide plate along the pattern section, and then be discharged to the outside through the fuel outflow section of the auxiliary plate connected to the pattern section.

The manifold may be formed by stacking the cover plate, the fuel guide plate, the air guide plate, and the auxiliary plate in that order. The air introduced into the air inflow section of the auxiliary plate from the outside may move to the flow paths through a second air flow hole formed through one end of the air guide plate, flow to the other end of the air guide plate along the flow paths, and then be supplied to the stack unit through a third air flow hole formed through the fuel guide plate at a position corresponding to the other end of the air guide plate and through the first air flow hole of the cover plate communicating with the third air flow hole.

The manifold may be formed by stacking the cover plate, the fuel guide plate, the air guide plate, and the auxiliary plate in that order. The fuel introduced into the first fuel flow hole of the cover plate from the stack unit may be introduced into one side of the fuel guide plate, flow to the other side of the fuel guide plate along the pattern section, and then be discharged to the outside through the fuel outflow section of the auxiliary plate by passing through a third fuel flow hole formed through the other side of the fuel guide plate and a second fuel flow hole formed through the air guide plate at a position corresponding to the third fuel flow hole.

The manifold may be formed by stacking the cover plate, the air guide plate, the fuel guide plate, and the auxiliary plate in that order. The air introduced into the air inflow section of the auxiliary plate from the outside may move to the flow paths through a third air flow hole formed through the fuel guide plate at a position corresponding to the air inflow section and through a second air flow hole formed through one end of the air guide plate at a position corresponding to the third air flow hole, flow to the other end of the air guide plate along the flow paths, and then be supplied to the stack unit through the first air flow hole of the cover plate communicating with the other end of the air guide plate.

The manifold may be formed by stacking the cover plate, the air guide plate, the fuel guide plate, and the auxiliary plate in that order. The fuel introduced into the first fuel flow hole of the cover plate from the stack unit may be introduced into one side of the fuel guide plate through a second fuel flow hole formed along the air guide plate at a position corresponding to the first fuel flow hole, flow to the other side of the fuel guide plate along the pattern section, and then be discharged to the outside through the fuel outflow section of the auxiliary plate by passing through a third fuel flow hole formed through the other side of the fuel guide plate.

The pattern section of the fuel guide plate may include a groove recessed to a predetermined width and a predetermined depth from one surface of the fuel guide plate, and the plurality of protrusions protruding to a predetermined height from the groove. A distance between adjacent protrusions may be greater than a height of each protrusion.

A sum of a distance between adjacent flow paths of the air guide plate and a width of each flow path may be greater than a depth of the associated flow path.

The stack unit and the manifold may be stacked such that cathodes of the unit cells are directed toward the manifold.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figures 1, 2:
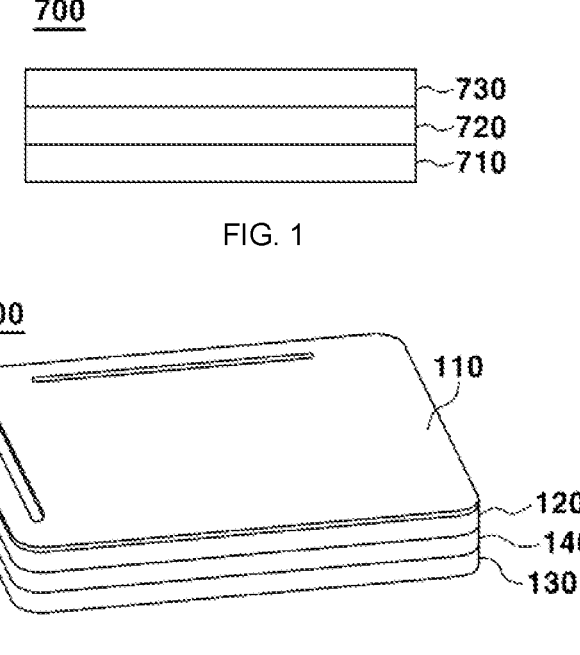
FIG. 1 is a cross-sectional view illustrating a unit cell according to the present invention.
FIG. 2 is a perspective view illustrating a manifold according to a first embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The above and other aspects, features, and advantages of the present invention will be easily understood with reference to the following preferred embodiments in conjunction with the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art.

Throughout the disclosure, like reference numerals refer to like elements throughout the various figures. The drawings are not necessarily to scale and in some instances, proportions may have been exaggerated in order to clearly illustrate features of the present invention. Terms such as "first" and/or "second" may be used herein to describe various elements of the present invention, but these elements should not be construed as being limited by the terms. These terms will be used only for the purpose of differentiating one element from other elements of the present invention. For example, without departing from the scope and spirit of the present invention, a first element may be referred to as a second element, and, similarly, a second element may also be referred to as a first element. As used herein, the singular forms "a", "an" and "the" are intended to include the plural forms as well, unless the context clearly indicates otherwise.

It should be understood that the terms "comprises/includes" and/or "comprising/including", when used in the specification, specify the presence of stated features, integers, steps, operations, elements, components, and/or groups thereof, but do not preclude the presence or addition of one or more other features, integers, steps, operations, elements, components, and/or groups thereof. When a part such as a layer, a film, a region, or a plate is referred to as being "on" another part, it not only refers to the case where the part is "directly on" the other part but also the case where a further part exists in between. Conversely, when a part such as a layer, a film, a region, or a plate is referred to as being "beneath" another part, it not only refers to the case where the part is "directly beneath" the other part but also the case where a further part exists in between.

Unless otherwise specified, all numbers, values, and/or expressions representing quantities of ingredients, reaction conditions, polymer compositions and formulations used herein are approximations that reflect various uncertainties in the measurement that arise in obtaining such values, among others, in nature as these numbers are inherently different, so the same should be understood as being modified by the term "about" in all cases. In addition, where numerical ranges are disclosed in the description, such ranges are continuous and include all values from the minimum to the maximum within the range, unless otherwise indicated. Furthermore, when such ranges refer to integers, they include all integers from the minimum to the maximum within the range, unless otherwise indicated.

A fuel cell stack according to the present invention includes a stack unit in which a plurality of unit cells are stacked, and a manifold disposed on one surface of the stack unit to provide an inflow path for air and an outflow path for fuel.

FIG. 1 is a cross-sectional view illustrating one of the unit cells. Referring to the drawing, the unit cell, which is designated by reference numeral 700, includes a cathode 710, an electrolyte membrane 720, and an anode 730.

When an oxidant such as air or oxygen is supplied to the cathode 710, the reaction as illustrated in the following Formula 1 occurs, thereby producing oxygen ions.

$$\tfrac{1}{2}O_2 + 2e^- \rightarrow O^{2-} \qquad \text{[Formula 1]}$$

The oxygen ions migrate to the anode 730 through the electrolyte membrane 720.

When fuel such as hydrogen or hydrocarbon is supplied to the anode 730, the oxygen ions react with the fuel to produce water and emit electrons, as illustrated in the following Formula 2.

$$O^{2-} + H_2 \rightarrow H_2O + 2e^- \qquad \text{[Formula 2]}$$

The oxygen ions produced by the oxidant in the cathode 710 migrate toward the anode 730 due to the concentration gradient of the oxygen ions, and the electrons flow from the anode 730 to the cathode 710 along an external circuit electrically connecting the cathode 710 and the anode 730.

Here, the electrolyte membrane 720 may block the permeation of the oxidant and the fuel. The electrolyte membrane 720 does not conduct electrons, but may allow the oxygen ions to permeate.

As such, when the oxygen ions migrate from the cathode 710 to the anode 730 to maintain the overall charge equilibrium, useful power may be produced through the oxidation reaction of the fuel. In this case, only pure water and heat are discharged as by-products of the reaction, and may also be usefully utilized.

The manifold may include a cover plate, an air guide plate configured to guide a flow of air in the manifold, a fuel guide plate configured to guide a flow of fuel in the manifold, and an auxiliary plate providing a passage for inflow of air and outflow of fuel.

The present invention is characterized in that the manifold is formed by stacking a plurality of plates as described above, and effects such as minimizing the temperature gradient within the stack or minimizing the temperature of the system are realized by changing the stacking order of the plates. Hereinafter, various embodiments of the present invention will be described in detail.

Figure 3:
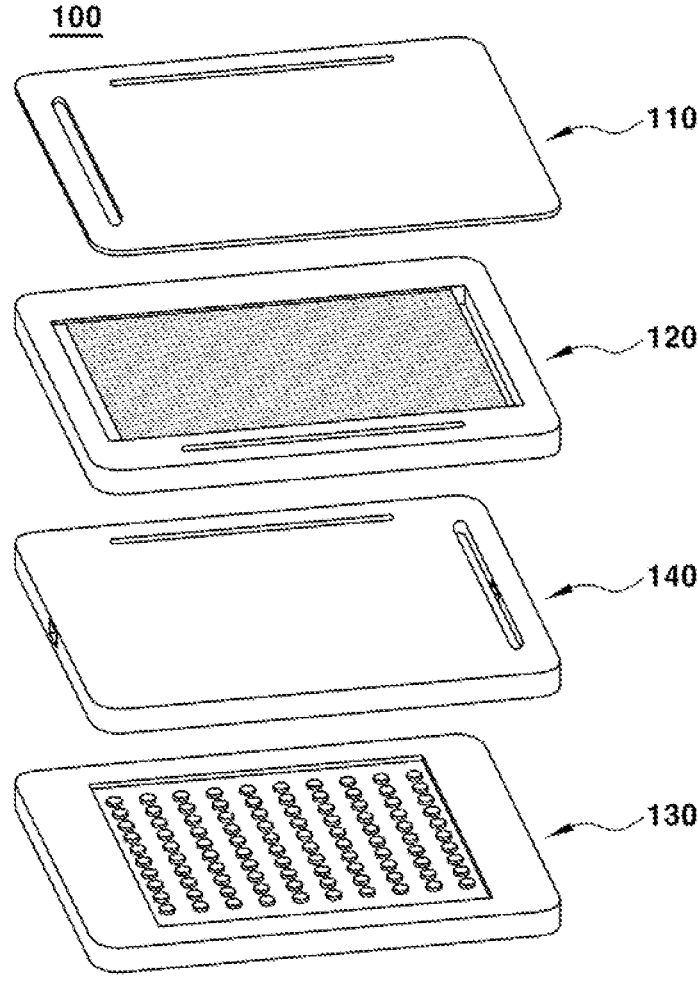
FIG. 3 is an exploded perspective view illustrating the manifold according to the first embodiment of the present invention.

FIG. 2 is a perspective view illustrating a manifold 100 according to a first embodiment of the present invention. FIG. 3 is an exploded perspective view illustrating the manifold 100 according to the first embodiment of the present invention. The first embodiment of the present invention is designed to minimize an in-stack temperature gradient.

The manifold 100 may be formed by stacking a cover plate 110, an air guide plate 120, an auxiliary plate 140, and a fuel guide plate 130 in that order.

Figure 4:
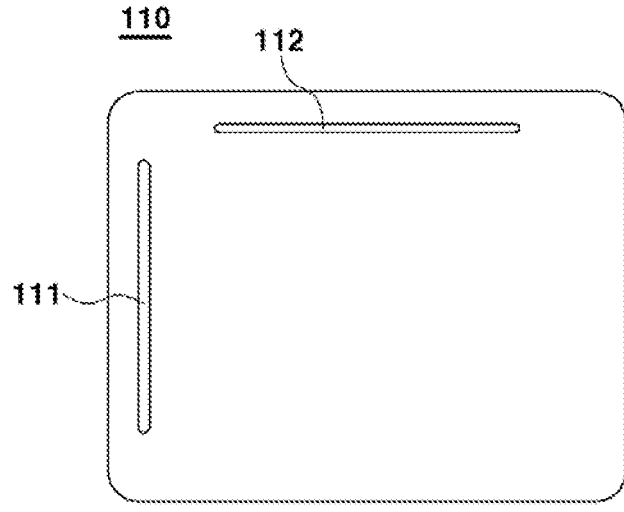
FIG. 4 is a top view illustrating a cover plate of the manifold according to the first embodiment of the present invention.

FIG. 4 is a top view illustrating the cover plate 110. The cover plate 110 may include a first air flow hole 111 formed therethrough and extending along one side thereof, and a first fuel flow hole 112 formed therethrough and extending along another side thereof that is connected to the one side.

Figure 5:
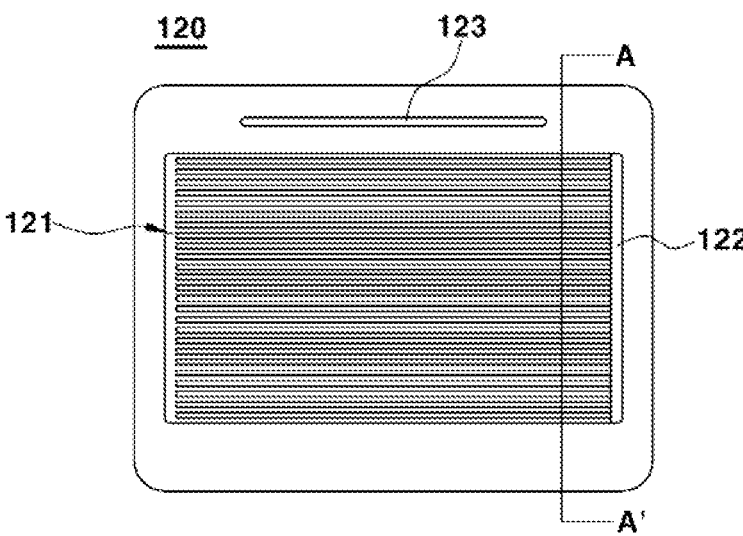
FIG. 5 is a top view illustrating an air guide plate of the manifold according to the first embodiment of the present invention.

FIG. 5 is a top view illustrating the air guide plate 120. The air guide plate 120 may include a plurality of flow paths 121 for guiding air to flow from one end to the other end thereof, a second air flow hole 122 formed therethrough and extending along the one end, and a second fuel flow hole 123 formed therethrough and extending along one side thereof that is connected to the one end.

Figure 6:
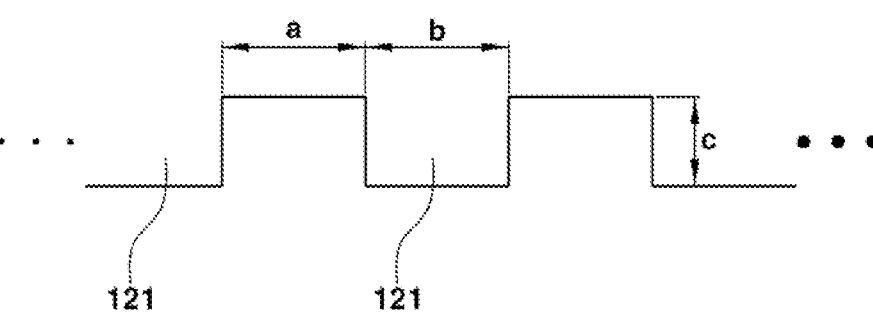
FIG. 6 is a cross-sectional view taken along line A-A' of FIG. 5 and illustrates a portion of a region corresponding to a flow path.

FIG. 6 is a cross-sectional view taken along line A-A' of FIG. 5 and illustrates a portion of a region corresponding to the flow paths 121. Referring to the drawing, the present embodiment is characterized in that the sum of the distance a between adjacent flow paths 121 and the width b of each flow path 121 is greater than the depth c of the associated flow path 121.

Figure 7:
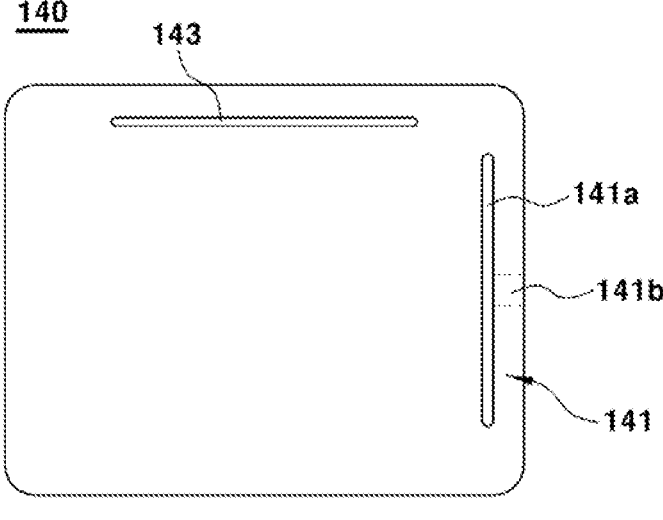
FIG. 7 is a top view illustrating an auxiliary plate of the manifold according to the first embodiment of the present invention.
Figure 8:
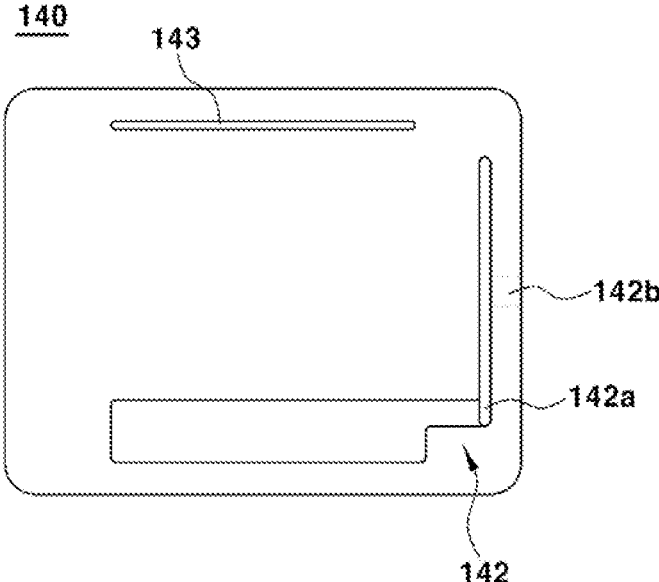
FIG. 8 is a bottom view illustrating the auxiliary plate of the manifold according to the first embodiment of the present invention.

FIG. 7 is a top view illustrating the auxiliary plate 140. FIG. 8 is a bottom view illustrating the auxiliary plate 140. The auxiliary plate 140 may include an air inflow section 141 recessed into one surface of one end thereof and configured to communicate with the outside for the inflow of air introduced from the outside, a fuel outflow section 142 recessed into the other surface of the other end thereof and configured to communicate with the outside to discharge the fuel in the manifold 100 to the outside, and a third fuel flow hole 143 formed therethrough and extending along one side thereof that is connected to the one end.

The air inflow section 141 may include an air accommodation part 141a recessed therefrom to provide a space for the inflow of air introduced from the outside, and an air inflow path 141b configured to connect a side wall partitioning the air accommodation part 141a to a side surface of the auxiliary plate 140 so that the air accommodation part 141a communicates with the outside.

The fuel outflow section 142 may include a fuel accommodation part 142a recessed therefrom to provide a space for the inflow of fuel introduced into the auxiliary plate 140, and a fuel outflow path 142b configured to connect a side wall partitioning the fuel accommodation part 142a to the side surface of the auxiliary plate 140 so that the fuel accommodation part 142a communicates with the outside. The fuel accommodation part 142a may be a space recessed in the space defined by the other end of the auxiliary plate 140 and one side thereof that is connected to the other end at the other side thereof facing the third fuel flow hole 143.

Figure 9:
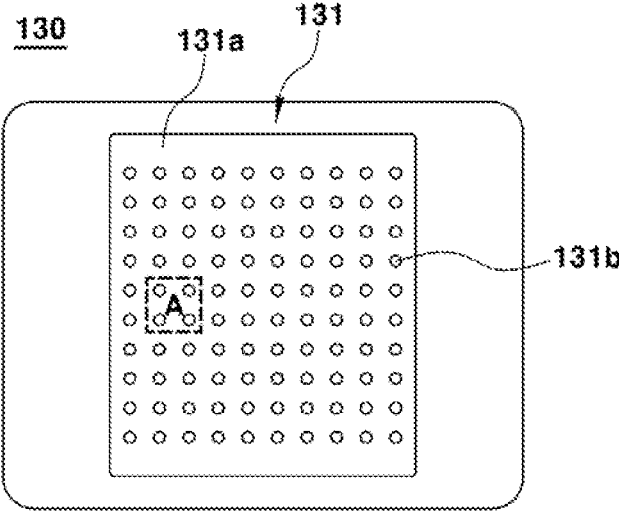
FIG. 9 is a top view illustrating a fuel guide plate of the manifold according to the first embodiment of the present invention.

FIG. 9 is a top view illustrating the fuel guide plate 130. The fuel guide plate 130 may include a pattern section 131 provided with a plurality of protrusions 131b for guiding fuel to flow from one side to the other side thereof.

The pattern section 131 may include a groove 131a recessed to a predetermined width and a predetermined depth in the center of the fuel guide plate 130, and the plurality of protrusions 131b protruding to a predetermined height from the groove 131a.

Figure 10A:
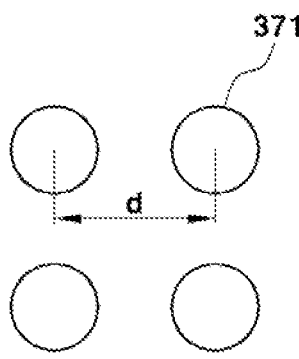
FIG. 10A is a view illustrating region A of FIG. 9.
Figure 10B:
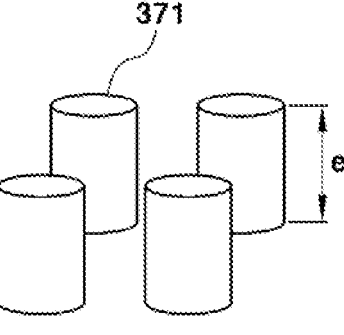
FIG. 10B is a perspective view illustrating region A of FIG. 9.

FIG. 10A is a top view illustrating region A of FIG. 9. FIG. 10B is a perspective view illustrating region A of FIG. 9. The fuel introduced into the fuel guide plate 130 through the groove 131a is guided by the protrusions 131b and flows into the space therebetween.

Each of the protrusions 131b may have a predetermined shape. However, the present invention is not limited thereto, and the protrusion 131b may have, for example, a cylindrical shape, a conical shape, or a square prism shape.

The present embodiment is characterized in that the distance d between adjacent protrusions 131b is greater than the height e of each protrusion 131b.

Figure 11:
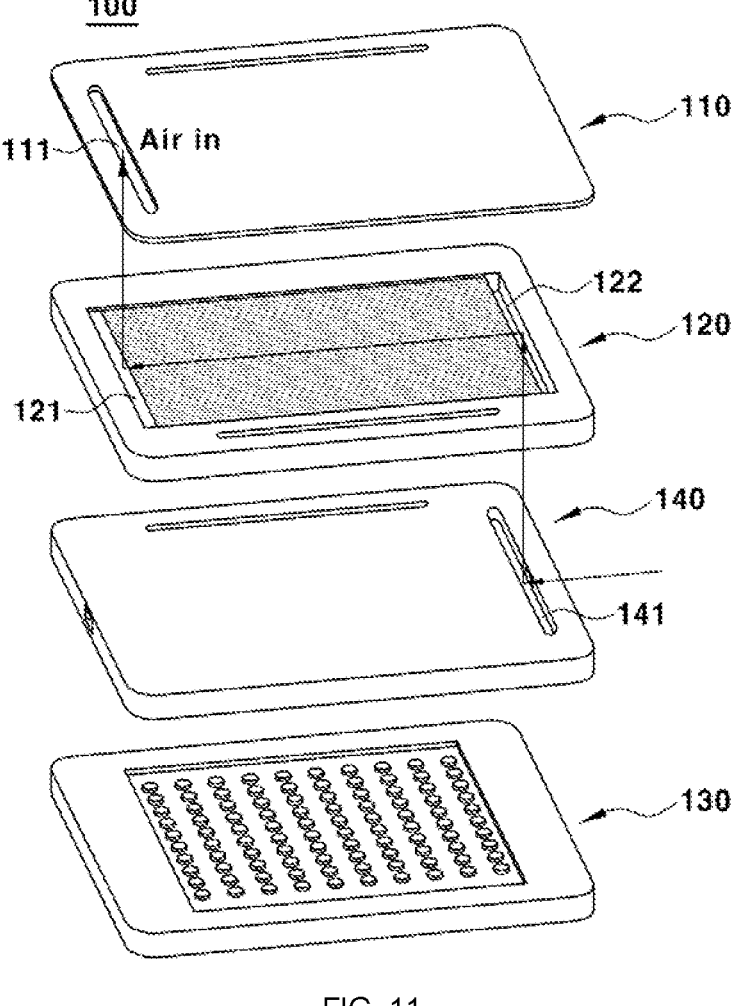
FIG. 11 is a view illustrating a flow of air in the manifold according to the first embodiment of the present invention.

FIG. 11 is a view illustrating the flow of air in the manifold 100 according to the first embodiment of the present invention. Referring to the drawing, the air introduced into the air inflow section 141 of the auxiliary plate 140 from the outside moves to the flow paths 121 through the second air flow hole 122 formed through one end of the air guide plate 120. Subsequently, the air flows to the other end of the air guide plate 120 along the flow paths 121, and is then supplied to the stack unit through the first air flow hole 111 of the cover plate 110 communicating with the other end of the air guide plate 120.

Figure 12:
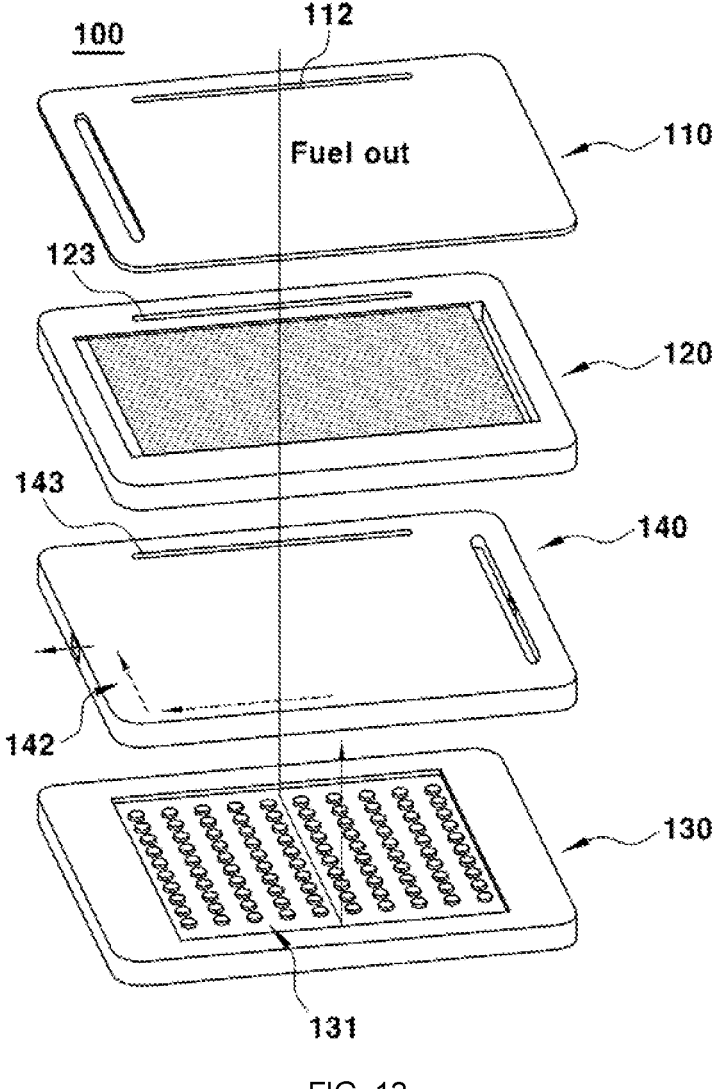
FIG. 12 is a view illustrating a flow of fuel in the manifold according to the first embodiment of the present invention.

FIG. 12 is a view illustrating the flow of fuel in the manifold 100 according to the first embodiment of the present invention. Referring to the drawing, the fuel introduced into the first fuel flow hole 112 of the cover plate 110 from the stack unit moves to one side of the fuel guide plate 130 through the second fuel flow hole 123 formed through the air guide plate 120 at a position corresponding to the first fuel flow hole 112 and through the third fuel flow hole 143 formed through the auxiliary plate 140 at a position corresponding to the second fuel flow hole 123. Subsequently, the fuel flows from one side to the other side of the fuel guide plate 130 along the pattern section 131 of the fuel guide plate 130, and is then discharged to the outside through the fuel outflow section 142 of the auxiliary plate 140 connected to the pattern section 131.

Figure 13:
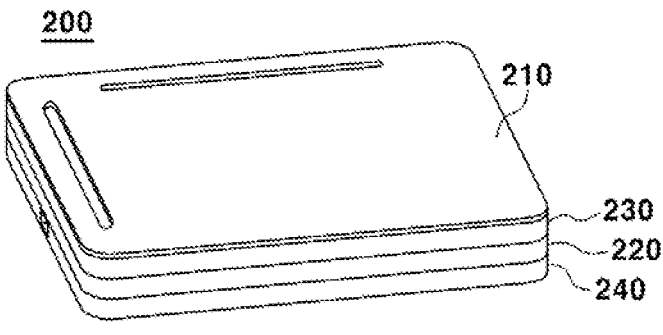
FIG. 13 is a perspective view illustrating a manifold according to a second embodiment of the present invention.
Figure 14:
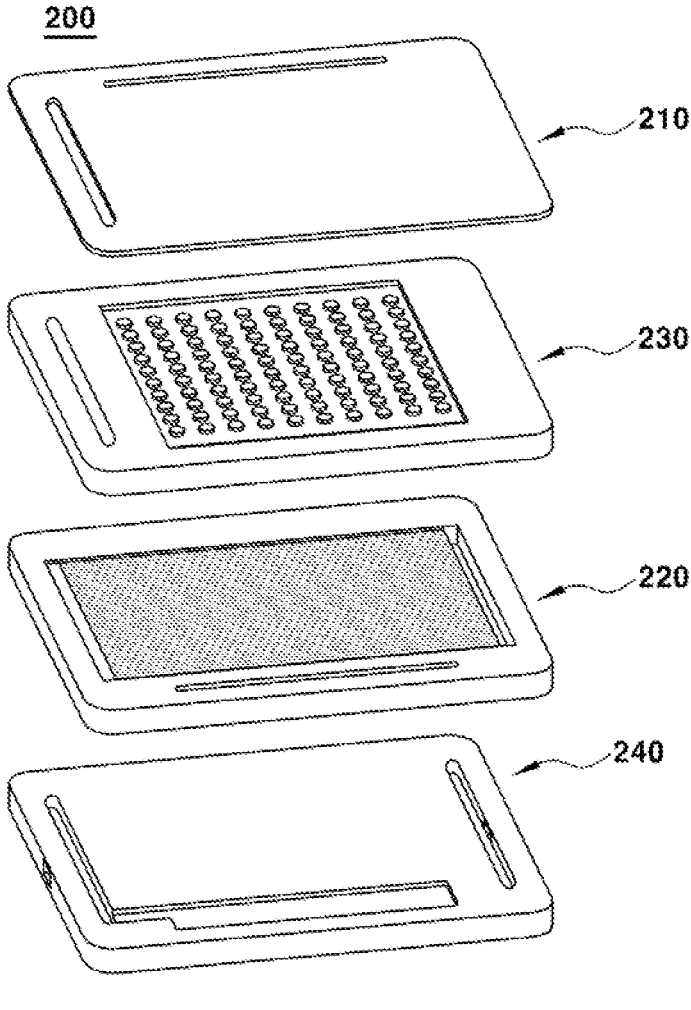
FIG. 14 is an exploded perspective view illustrating the manifold according to the second embodiment of the present invention.

FIG. 13 is a perspective view illustrating a manifold 200 according to a second embodiment of the present invention. FIG. 14 is an exploded perspective view illustrating the manifold 200 according to the second embodiment of the present invention. The second embodiment of the present invention is designed to minimize a system temperature.

The manifold 200 may be formed by stacking a cover plate 210, a fuel guide plate 230, an air guide plate 220, and an auxiliary plate 240 in that order.

Figure 15:
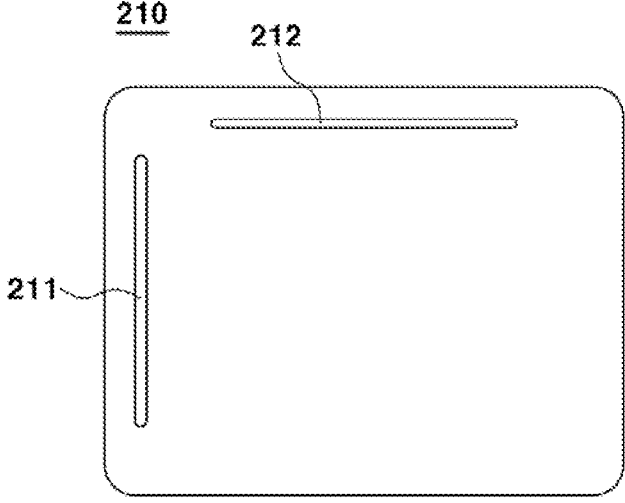
FIG. 15 is a top view illustrating a cover plate of the manifold according to the second embodiment of the present invention.

FIG. 15 is a top view illustrating the cover plate 210. The cover plate 210 may include a first air flow hole 211 formed therethrough and extending along one side thereof, and a first fuel flow hole 212 formed therethrough and extending along another side thereof that is connected to the one side.

Figure 16:
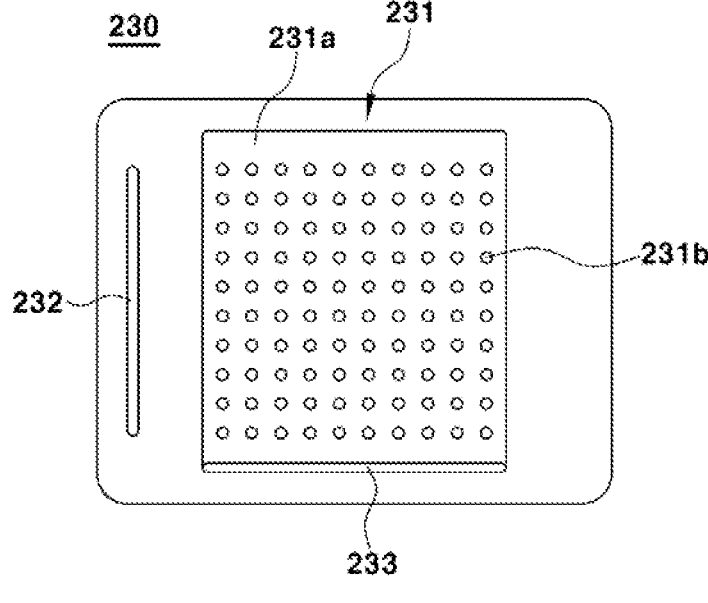
FIG. 16 is a top view illustrating a fuel guide plate of the manifold according to the second embodiment of the present invention.

FIG. 16 is a top view illustrating the fuel guide plate 230. The fuel guide plate 230 may include a pattern section 231 provided with a plurality of protrusions 231*b* for guiding fuel to flow from one side to the other side thereof, a third air flow hole 232 formed therethrough and extending along one side thereof, and a third fuel flow hole 233 formed therethrough and extending along the other side thereof on the pattern section 231.

The pattern section 231 may include a groove 231*a* recessed to a predetermined width and a predetermined depth in the center of the fuel guide plate 230, and the plurality of protrusions 231*b* protruding to a predetermined height from the groove 231*a*. A detailed description thereof will be omitted below since the contents related thereto are the same as those described above.

Figure 17:
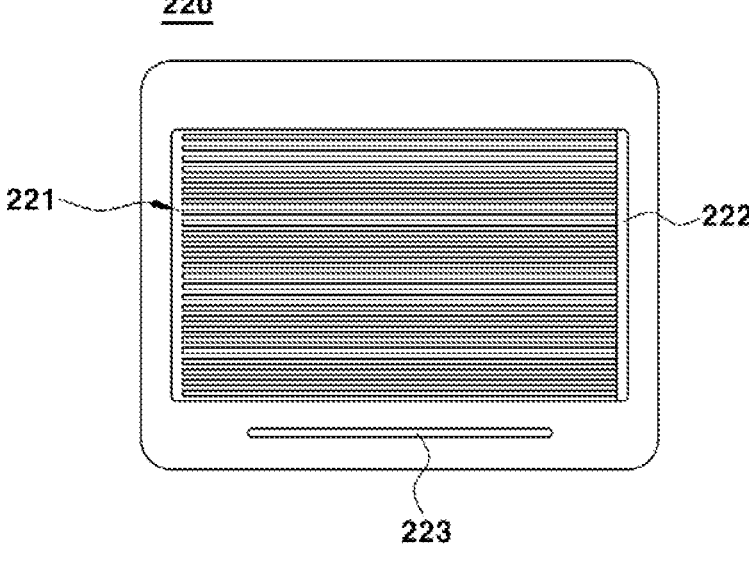
FIG. 17 is a top view illustrating an air guide plate of the manifold according to the second embodiment of the present invention.

FIG. 17 is a top view illustrating the air guide plate 220. The air guide plate 220 may include a plurality of flow paths 221 for guiding air to flow from one end to the other end thereof, a second air flow hole 222 formed therethrough and extending along the one end, and a second fuel flow hole 223 formed therethrough and extending along one side thereof that is connected to the one end. A detailed description of the flow paths 221 will be omitted below since the contents related thereto are the same as those described above.

Figure 18:
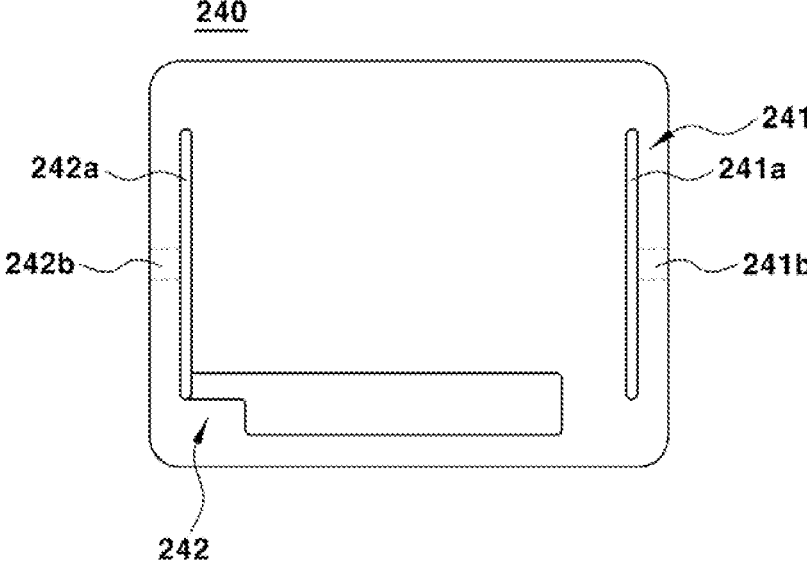
FIG. 18 is a top view illustrating an auxiliary plate of the manifold according to the second embodiment of the present invention.

FIG. 18 is a top view illustrating the auxiliary plate 240. The auxiliary plate 240 may include an air inflow section 241 recessed into one end thereof and configured to communicate with the outside for the inflow of air introduced from the outside, and a fuel outflow section 242 recessed into the other end thereof and configured to communicate with the outside to discharge the fuel in the manifold 200 to the outside.

The air inflow section 241 may include an air accommodation part 241*a* recessed therefrom to provide a space for the inflow of air introduced from the outside, and an air inflow path 241*b* configured to connect a side wall partitioning the air accommodation part 241*a* to a side surface of the auxiliary plate 240 so that the air accommodation part 241*a* communicates with the outside.

The fuel outflow section 242 may include a fuel accommodation part 242*a* recessed therefrom to provide a space for the inflow of fuel introduced into the auxiliary plate 240, and a fuel outflow path 242*b* configured to connect a side wall partitioning the fuel accommodation part 242*a* to the side surface of the auxiliary plate 240 so that the fuel accommodation part 242*a* communicates with the outside. The fuel accommodation part 242*a* may be a space recessed in the space defined by the other end of the auxiliary plate 240 and one side thereof that is connected to the other end.

Figure 19:
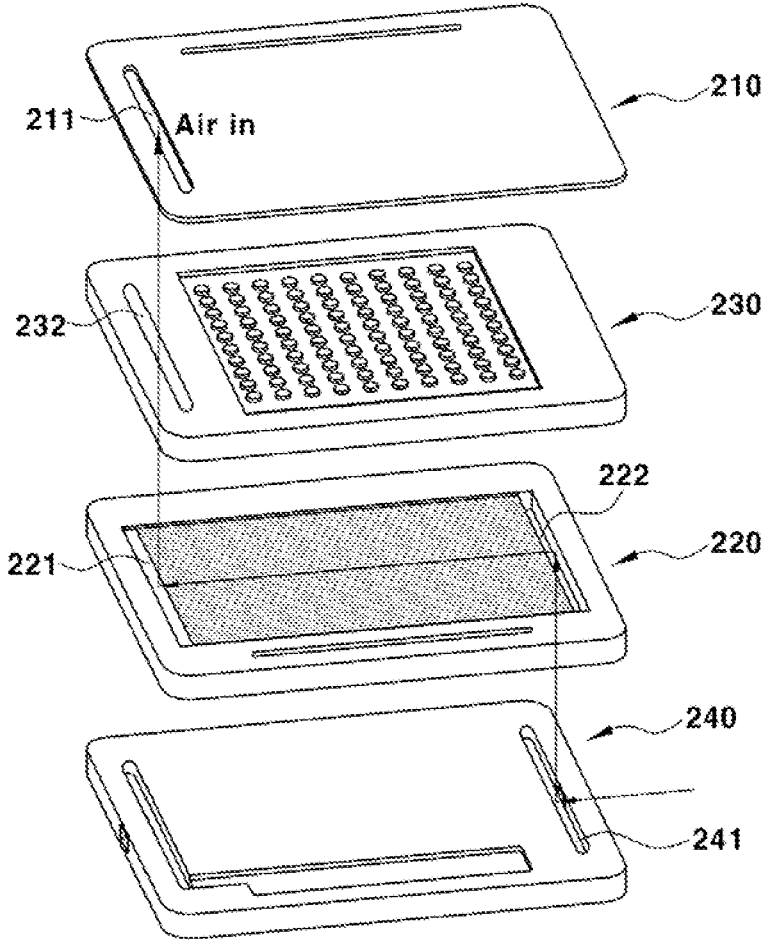
FIG. 19 is a view illustrating a flow of air in the manifold according to the second embodiment of the present invention.

FIG. 19 is a view illustrating the flow of air in the manifold 200 according to the second embodiment of the present invention. Referring to the drawing, the air introduced into the air inflow section 241 of the auxiliary plate 240 from the outside moves to the flow paths 221 through the second air flow hole 222 formed through one end of the air guide plate 220. Subsequently, the air flows to the other end of the air guide plate 220 along the flow paths 221, and is then supplied to the stack unit through the third air flow hole 232 formed through the fuel guide plate 230 at a position corresponding to the other end of the air guide plate 220 and through the first air flow hole 211 of the cover plate 210 communicating with the third air flow hole 232.

Figures 20, 21:
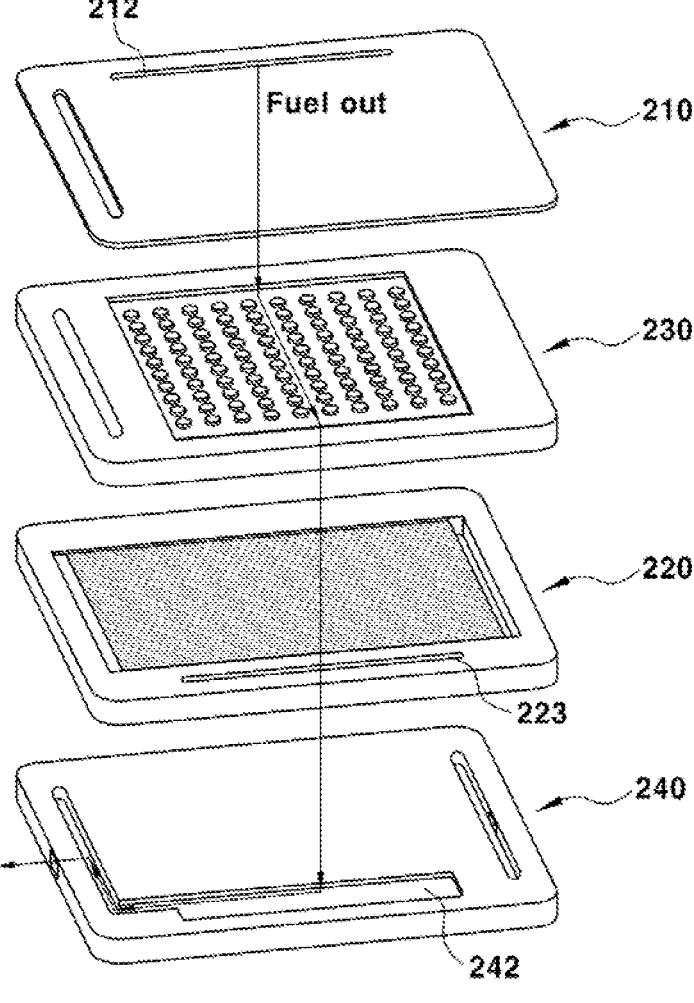
FIG. 20 is a view illustrating a flow of fuel in the manifold according to the second embodiment of the present invention.
FIG. 21 is a perspective view illustrating a manifold according to a third embodiment of the present invention.

FIG. 20 is a view illustrating the flow of fuel in the manifold 200 according to the second embodiment of the present invention. Referring to the drawing, the fuel introduced into the first fuel flow hole 212 of the cover plate 210 from the stack unit is introduced into one side of the fuel guide plate 230, flows to the other side of the fuel guide plate along the pattern section 231, and is then discharged to the outside through the fuel outflow section 242 of the auxiliary plate 240 by passing through the third fuel flow hole 233 formed through the other side of the fuel guide plate 230 and the second fuel flow hole 223 formed through the air guide plate 220 at a position corresponding to the third fuel flow hole 233.

Figure 22:
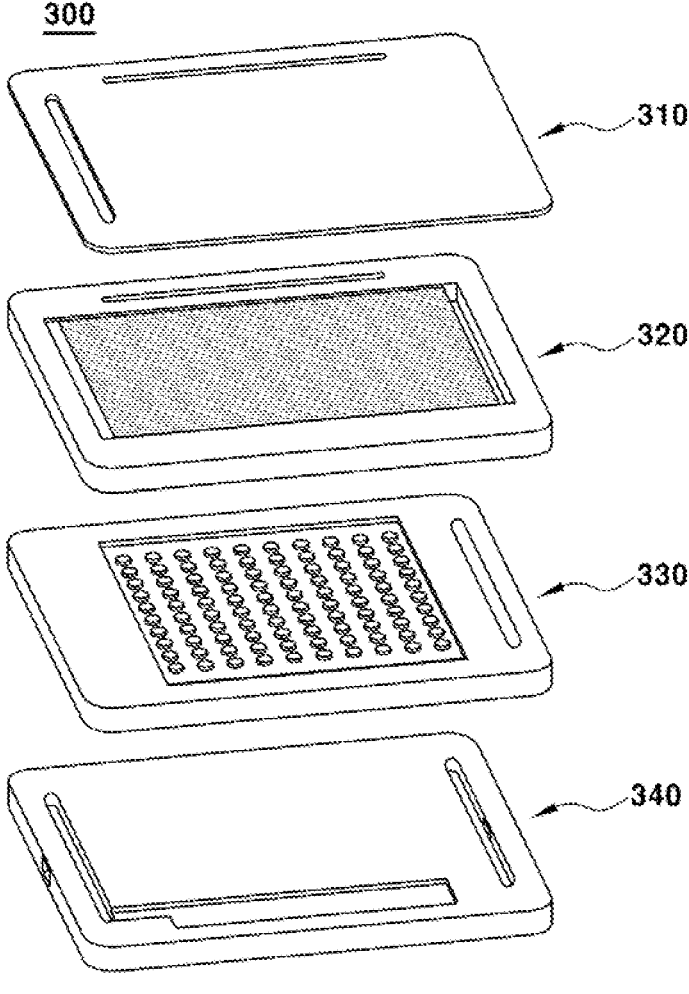
FIG. 22 is an exploded perspective view illustrating the manifold according to the third embodiment of the present invention.

FIG. 21 is a perspective view illustrating a manifold 300 according to a third embodiment of the present invention. FIG. 22 is an exploded perspective view illustrating the manifold 300 according to the third embodiment of the present invention. The third embodiment of the present invention is designed to reduce an in-stack temperature gradient and a system temperature in a balanced manner.

The manifold 300 may be formed by stacking a cover plate 310, an air guide plate 320, a fuel guide plate 330, and an auxiliary plate 340 in that order.

Figure 23:
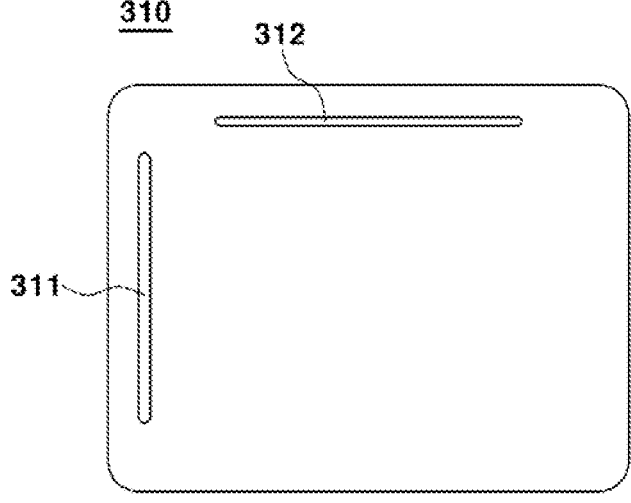
FIG. 23 is a top view illustrating a cover plate of the manifold according to the third embodiment of the present invention.

FIG. 23 is a top view illustrating the cover plate 310. The cover plate 310 may include a first air flow hole 311 formed therethrough and extending along one side thereof, and a first fuel flow hole 312 formed therethrough and extending along another side thereof that is connected to the one side.

Figure 24:
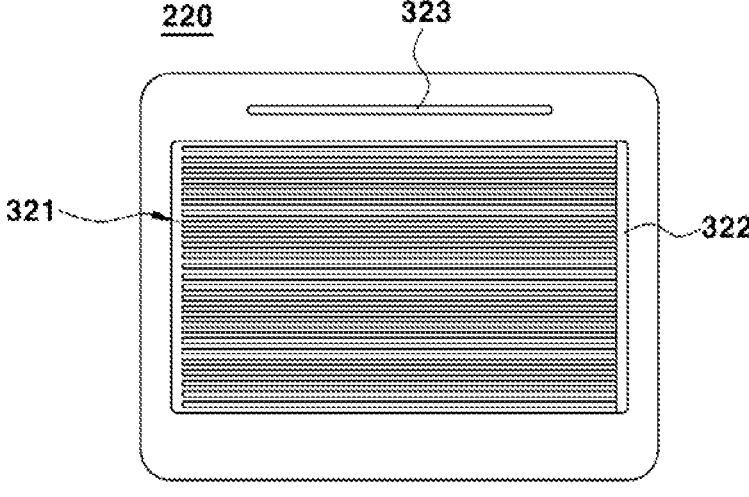
FIG. 24 is a top view illustrating an air guide plate of the manifold according to the third embodiment of the present invention.

FIG. 24 is a top view illustrating the air guide plate 320. The air guide plate 320 may include a plurality of flow paths 321 for guiding air to flow from one end to the other end thereof, a second air flow hole 322 formed therethrough and extending along the one end, and a second fuel flow hole 323 formed therethrough and extending along one side thereof that is connected to the one end. A detailed description of the flow paths 321 will be omitted below since the contents related thereto are the same as those described above.

Figure 25:
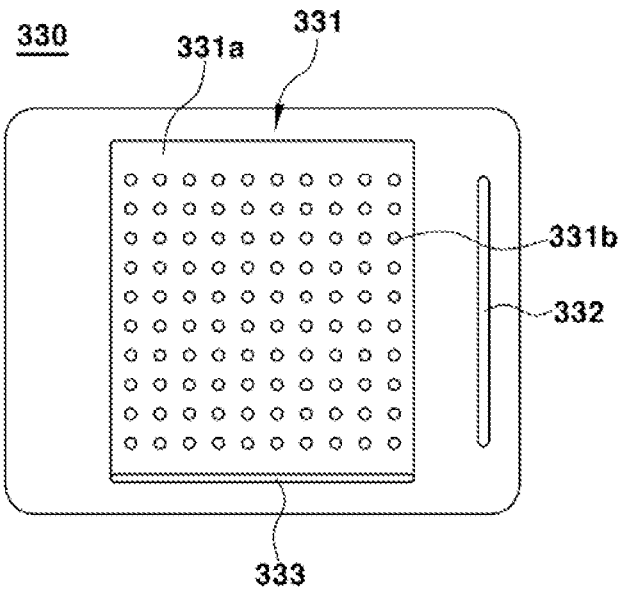
FIG. 25 is a top view illustrating a fuel guide plate of the manifold according to the third embodiment of the present invention.

FIG. 25 is a top view illustrating the fuel guide plate 330. The fuel guide plate 330 may include a pattern section 331 provided with a plurality of protrusions 331*b* for guiding fuel to flow from one side to the other side thereof, a third air flow hole 332 formed therethrough and extending along one side thereof, and a third fuel flow hole 333 formed therethrough and extending along the other side thereof on the pattern section 331.

The pattern section 331 may include a groove 331*a* recessed to a predetermined width and a predetermined depth in the center of the fuel guide plate 330, and the plurality of protrusions 331*b* protruding to a predetermined height from the groove 331*a*. A detailed description thereof will be omitted below since the contents related thereto are the same as those described above.

Figure 26:
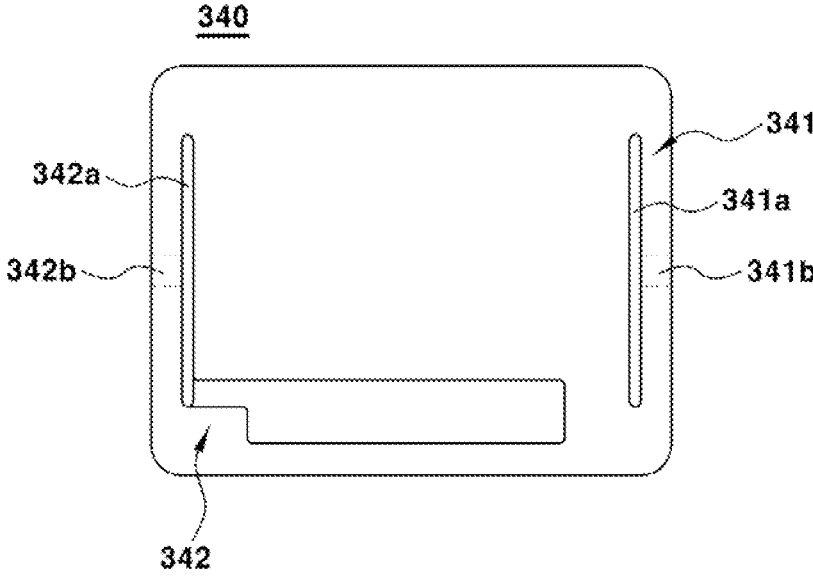
FIG. 26 is a top view illustrating an auxiliary plate of the manifold according to the third embodiment of the present invention.

FIG. 26 is a top view illustrating the auxiliary plate 340. The auxiliary plate 340 may include an air inflow section 341 recessed into one end thereof and configured to communicate with the outside for the inflow of air introduced from the outside, and a fuel outflow section 342 recessed into the other end thereof and configured to communicate with the outside to discharge the fuel in the manifold 300 to the outside.

The air inflow section 341 may include an air accommodation part 341*a* recessed therefrom to provide a space for the inflow of air introduced from the outside, and an air inflow path 341*b* configured to connect a side wall partitioning the air accommodation part 341*a* to a side surface of the auxiliary plate 340 so that the air accommodation part 341*a* communicates with the outside.

The fuel outflow section 342 may include a fuel accommodation part 342*a* recessed therefrom to provide a space for the inflow of fuel introduced into the auxiliary plate 340, and a fuel outflow path 342*b* configured to connect a side wall partitioning the fuel accommodation part 342*a* to the side surface of the auxiliary plate 340 so that the fuel accommodation part 342a communicates with the outside. The fuel accommodation part 342a may be a space recessed in the space defined by the other end of the auxiliary plate 340 and one side thereof that is connected to the other end.

Figure 27:
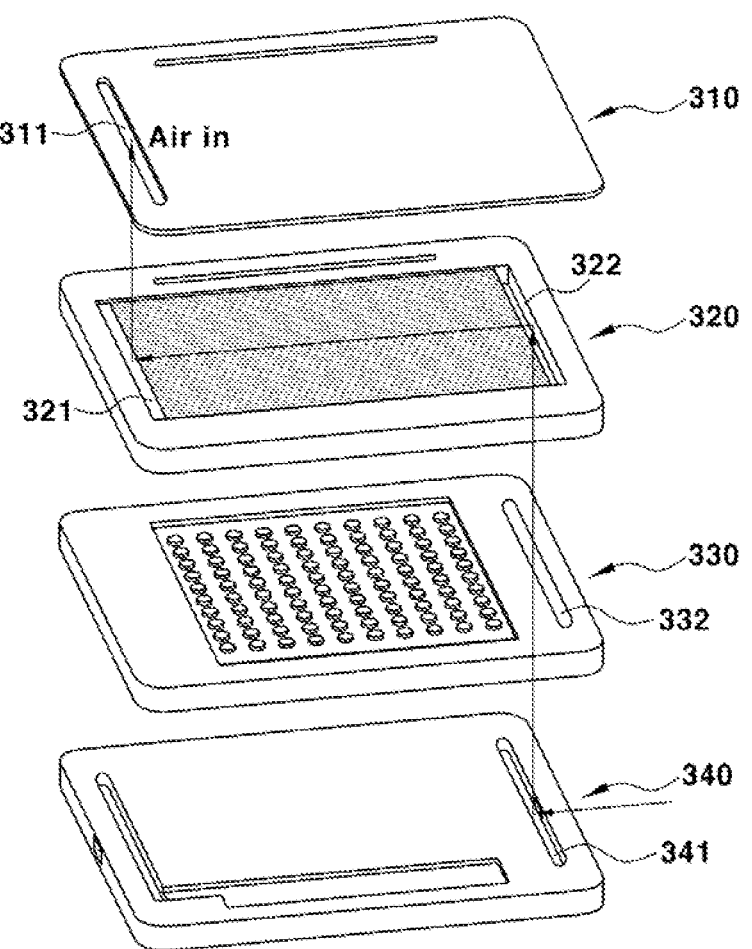
FIG. 27 is a view illustrating a flow of air in the manifold according to the third embodiment of the present invention.

FIG. 27 is a view illustrating the flow of air in the manifold 300 according to the third embodiment of the present invention. Referring to the drawing, the air introduced into the air inflow section 341 of the auxiliary plate 340 from the outside moves to the flow paths 321 through the third air flow hole 332 formed through the fuel guide plate 330 at a position corresponding to the air inflow section 341 and through the second air flow hole 322 formed through one end of the air guide plate 320 at a position corresponding to the third air flow hole 332. Subsequently, the air flows from one end to the other end of the air guide plate 320 along the flow paths, and is then supplied to the stack unit through the first air flow hole 311 of the cover plate 310 communicating with the other end of the air guide plate 320.

Figure 28:
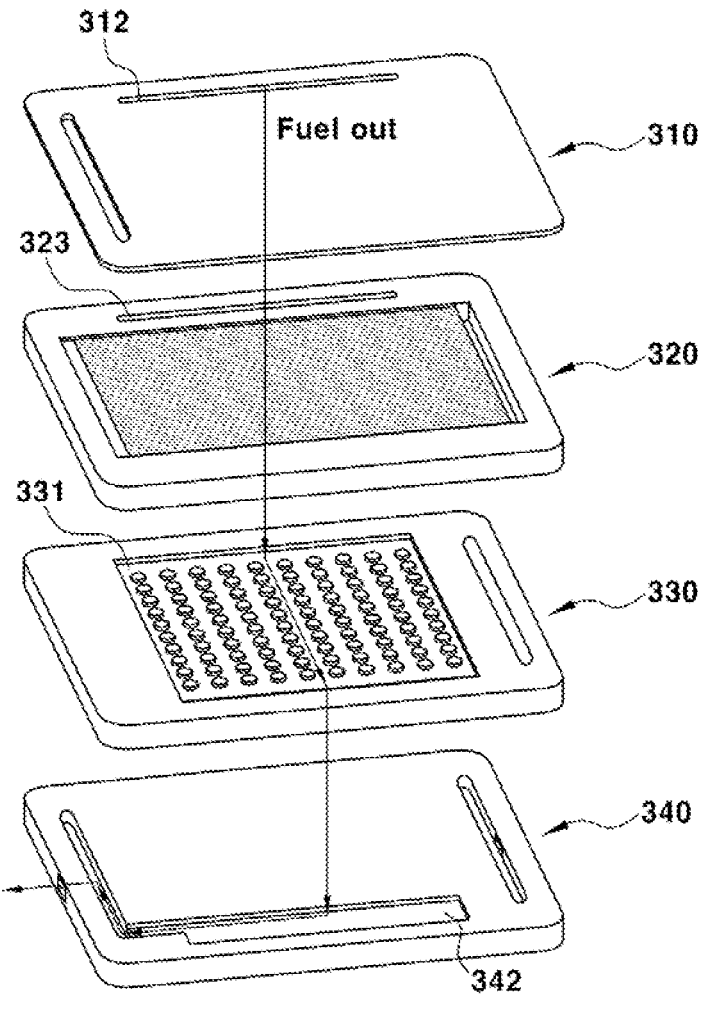
FIG. 28 is a view illustrating a flow of fuel in the manifold according to the third embodiment of the present invention.

FIG. 28 is a view illustrating the flow of fuel in the manifold 300 according to the third embodiment of the present invention. Referring to the drawing, the fuel introduced into the first fuel flow hole 312 of the cover plate 310 from the stack unit is introduced into one side of the fuel guide plate 330 through the second fuel flow hole 323 formed along the air guide plate 320 at a position corresponding to the first fuel flow hole 312, and then flows to the other side of the fuel guide plate 330 along the pattern section 331. Subsequently, the fuel passes through the third fuel flow hole 333 formed through the other side of the fuel guide plate 330 and is then discharged to the outside through the fuel outflow section 342 of the auxiliary plate 340.

The fuel cell stack according to the present invention may include the stack unit in which the plurality of unit cells 700 are stacked, and the manifold 100, 200, or 300 disposed on one surface of the stack unit to provide the inflow path for air and the outflow path for fuel. In this case, the stack unit and the manifold 100, 200, or 300 may be stacked such that the cathode 710 of each unit cell 700 is directed toward the manifold 100, 200, or 300. Due to the large heat capacity and low thermal conductivity of air, heat is mainly conducted toward the inlet of air. In addition, the substance in the end cell is transferred from the anode 730 to the cathode 710, and thermal convection occurs in the same direction. Therefore, the present invention can achieve the minimization of heat conduction by disposing the cathode 710 toward the manifold 100, 200, or 300 through which air is introduced.

As is apparent from the above description, according to the present invention, it is possible to uniformly distribute gas to each unit cell in the fuel cell stack.

According to the present invention, it is possible to minimize the temperature gradient in the fuel cell stack.

The present invention is not limited to the above-mentioned effects. It should be understood that the present invention includes all effects that can be inferred from the above description.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell stack comprising:
a stack unit in which a plurality of unit cells are stacked; and a manifold disposed on one surface of the stack unit to provide an inflow path for air and an outflow path for fuel, wherein the manifold comprises:

a cover plate comprising a first air flow hole through which air passes and a first fuel flow hole through which fuel passes;

an air guide plate comprising a plurality of flow paths spaced apart from each other for guiding air introduced into one end of the air guide plate to flow toward another end of the air guide plate;

a fuel guide plate comprising a pattern section provided with a plurality of protrusions spaced apart from each other for guiding fuel introduced into one side of the fuel guide plate to flow toward another side of the fuel guide plate; and an auxiliary plate comprising an air inflow section configured to communicate with an outside for inflow of air introduced from the outside and a fuel outflow section configured to communicate with the outside to discharge fuel in the manifold to the outside;

wherein the air introduced into the air inflow section of the auxiliary plate from the outside moves to the flow paths through a second air flow hole formed through the one end of the air guide plate;

wherein a sum of a distance between adjacent flow paths of the air guide plate and a width of each of the adjacent flow paths is greater than a depth of an associated flow path;

wherein each of the adjacent flow paths has an opening facing the second air flow hole; and wherein the fuel outflow section includes a fuel accommodation part recessed from the fuel outflow section to provide a space for inflow of fuel introduced into the auxiliary plate, and a fuel outflow path configured to connect a side wall partitioning the fuel accommodation part to a side surface of the auxiliary plate, to provide for communication of the fuel accommodation part with the outside.

2. The fuel cell stack according to claim 1, wherein:
the manifold is formed by stacking in order of the cover plate, the air guide plate, the auxiliary plate, and the fuel guide plate; and
the air introduced into the air inflow section flows to the other end of the air guide plate along the flow paths, and is then supplied to the stack unit through the first air flow hole of the cover plate, the first air flow hole communicating with the other end of the air guide plate.

3. The fuel cell stack according to claim 1, wherein:
the manifold is formed by stacking in order of the cover plate, the air guide plate, the auxiliary plate, and the fuel guide plate; and
fuel introduced into the first fuel flow hole of the cover plate from the stack unit is introduced to the one side of the fuel guide plate through a second fuel flow hole formed through the air guide plate at a position corresponding to the first fuel flow hole and through a third fuel flow hole formed through the auxiliary plate at a position corresponding to the second fuel flow hole, flows to the other side of the fuel guide plate along the pattern section, and is then discharged to the outside through the fuel outflow section of the auxiliary plate connected to the pattern section.

4. The fuel cell stack according to claim 1, wherein:
the manifold is formed by stacking in order of the cover plate, the fuel guide plate, the air guide plate, and the auxiliary plate; and the air introduced into the air inflow section of the auxiliary plate from the outside moves to the flow paths through the second air flow hole formed through the one end of the air guide plate, flows to the other end of the air guide plate along the flow paths, and is then supplied to the stack unit through a third air flow hole formed through the fuel guide plate at a position corresponding to the other end of the air guide plate and through the first air flow hole of the cover plate, the first air hole communicating with the third air flow hole.

5. The fuel cell stack according to claim 1, wherein:
the manifold is formed by stacking in order of the cover plate, the fuel guide plate, the air guide plate, and the auxiliary plate; and
the fuel introduced into the first fuel flow hole of the cover plate from the stack unit is introduced into the one side of the fuel guide plate, flows to the other side of the fuel guide plate along the pattern section, and is then discharged to the outside through the fuel outflow section of the auxiliary plate by passing through a third fuel flow hole formed through the other side of the fuel guide plate and a second fuel flow hole formed through the air guide plate at a position corresponding to the third fuel flow hole.

6. The fuel cell stack according to claim 1, wherein:
the manifold is formed by stacking in order of the cover plate, the air guide plate, the fuel guide plate, and the auxiliary plate; and
the air introduced into the air inflow section of the auxiliary plate from the outside moves to the flow paths through a third air flow hole formed through the fuel guide plate at a position corresponding to the air inflow section and through the second air flow hole formed through the one end of the air guide plate at a position corresponding to the third air flow hole, flows to the other end of the air guide plate along the flow paths, and is then supplied to the stack unit through the first air flow hole of the cover plate, the first air flow hole communicating with the other end of the air guide plate.

7. The fuel cell stack according to claim 1, wherein:
the manifold is formed by stacking in order of the cover plate, the air guide plate, the fuel guide plate, and the auxiliary plate; and
the fuel introduced into the first fuel flow hole of the cover plate from the stack unit is introduced into the one side of the fuel guide plate through second fuel flow hole formed along the air guide plate at a position corresponding to the first fuel flow hole, flows to the other side of the fuel guide plate along the pattern section, and is then discharged to the outside through the fuel outflow section of the auxiliary plate by passing through a third fuel flow hole formed through the other side of the fuel guide plate.

8. The fuel cell stack according to claim 1, wherein:
the pattern section of the fuel guide plate comprises a groove recessed to a predetermined width and a predetermined depth from one surface of the fuel guide plate, and the plurality of protrusions protruding to a predetermined height from the groove;
a distance between adjacent protrusions is greater than a height of each protrusion.

9. The fuel cell stack according to claim 1, wherein the stack unit and the manifold are stacked such that cathodes of the unit cells are directed toward the manifold.

10. The fuel cell stack according to claim 1, wherein openings of the adjacent flow paths are each a same distance from the second air flow hole.

11. The fuel cell stack according to claim 10, wherein the adjacent flow paths extend in a first direction and the second air flow hole extends in a second direction, and the first direction is orthogonal to the second direction.

* * * * *